United States Patent
Kabesa et al.

(10) Patent No.: US 11,425,132 B2
(45) Date of Patent: Aug. 23, 2022

(54) CROSS-DOMAIN AUTHENTICATION IN A MULTI-ENTITY DATABASE SYSTEM

(71) Applicant: Salesforce.com, Inc., San Francisco, CA (US)

(72) Inventors: Rafael Kabesa, San Francisco, CA (US); Samantha Ready, San Francisco, CA (US); Douglas Bitting, San Francisco, CA (US); Matthew Bahrenburg, San Francisco, CA (US); Sathish Raghunathan, San Francisco, CA (US)

(73) Assignee: Salesforce.com, Inc., San Francisco, CA (US)

( * ) Notice: Subject to any disclaimer, the term of this patent is extended or adjusted under 35 U.S.C. 154(b) by 257 days.

(21) Appl. No.: 16/207,630

(22) Filed: Dec. 3, 2018

(65) Prior Publication Data
US 2020/0177597 A1 Jun. 4, 2020

(51) Int. Cl.
*H04L 29/06* (2006.01)
*H04L 9/40* (2022.01)
*G06F 21/62* (2013.01)

(52) U.S. Cl.
CPC ........ *H04L 63/102* (2013.01); *G06F 21/6218* (2013.01); *H04L 63/0876* (2013.01)

(58) Field of Classification Search
CPC ............... H04L 63/102; H04L 63/0876; G06F 21/6218
USPC .......................................................... 726/6
See application file for complete search history.

(56) References Cited

U.S. PATENT DOCUMENTS

| | | | |
|---|---|---|---|
| 8,973,106 B2 | 3/2015 | Warshavsky et al. | |
| 9,628,493 B2 | 4/2017 | Warshavsky et al. | |
| 9,647,922 B2 | 5/2017 | Mortimore, Jr. et al. | |
| 10,049,131 B2 | 8/2018 | Torman et al. | |
| 2009/0037492 A1* | 2/2009 | Baitalmal | H04L 67/34 |
| 2011/0023101 A1* | 1/2011 | Vernal | H04L 63/102 726/7 |
| 2011/0119729 A1 | 5/2011 | Bergeson et al. | |
| 2011/0246765 A1 | 10/2011 | Schibuk | |
| 2011/0302630 A1 | 12/2011 | Nair et al. | |
| 2013/0086670 A1* | 4/2013 | Vangpat | H04L 63/102 726/8 |
| 2016/0173475 A1* | 6/2016 | Srinivasan | H04L 63/08 726/6 |
| 2016/0182479 A1* | 6/2016 | Kaplan | H04L 63/08 726/6 |
| 2017/0142105 A1* | 5/2017 | Doleh | H04L 63/06 |
| 2018/0095613 A1 | 4/2018 | Ready et al. | |

(Continued)

OTHER PUBLICATIONS

Liu, "All Your DNS Records Point to Us", Oct. 2016, ACM, pp. 1414-1425 (Year: 2016).*

*Primary Examiner* — Taghi T Arani
*Assistant Examiner* — Gregory A Lane
(74) *Attorney, Agent, or Firm* — Kwan & Olynick LLP

(57) ABSTRACT

An on-demand database system may receive a request to create a user account associated with a subdomain of the database system. The system may identify a pre-existing user account associated with a different subdomain of the database system where the pre-existing user account is associated with a personal communications address identified in the request. The system may create the requested account using personal information retrieved from the pre-existing user account.

19 Claims, 6 Drawing Sheets

(56) References Cited

U.S. PATENT DOCUMENTS

2018/0095733 A1 4/2018 Torman et al.
2018/0096024 A1 4/2018 Bitting et al.
2018/0096613 A1 4/2018 Torman et al.

* cited by examiner

CROSS-DOMAIN AUTHENTICATION IN A MULTI-ENTITY DATABASE SYSTEM

FIELD OF TECHNOLOGY

This patent document relates generally to multi-entity database systems and more specifically to identity authentication and management in such systems.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

A cloud computing environment often provides computing services to many different entities such as companies, company divisions, or service units of the cloud computing environment itself. Each of these entities may in turn provide access to the cloud computing environment for potentially many different users. A user often authenticates to the cloud computing environment when accessing services provided via the cloud computing environment.

In many configurations, an entity authorizes the creation of a digital identity within the cloud computing environment for a user associated with the entity. The entity may also assist in managing that digital identity, which may include information such as the user's role within or relationship to the entity.

BRIEF DESCRIPTION OF THE DRAWINGS

The included drawings are for illustrative purposes and serve only to provide examples of possible structures and operations for the disclosed inventive systems, apparatus, methods and computer program products for cross-domain authentication. These drawings in no way limit any changes in form and detail that may be made by one skilled in the art without departing from the spirit and scope of the disclosed implementations.

DETAILED DESCRIPTION

Figure 1:
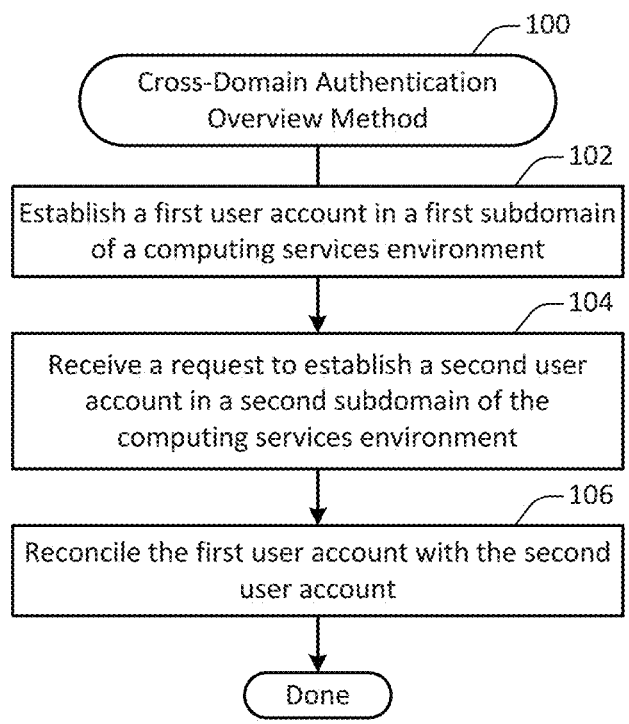
FIG. 1 illustrates an example of an overview method for cross-domain authentication, performed in accordance with one or more embodiments.

According to various embodiments, techniques and mechanisms described herein facilitate the authentication of users and the efficient and secure management of user account information within a multi-entity database system provided via a computing services environment. A computing services environment may provide potentially many different on-demand computing services such as database systems to potentially many different entities. A user may be associated with potentially many different local user accounts. For example, a user who has changed employees or who works as an independent contractor may have access to the computing services environment through multiple entities and may therefore be associated with local user accounts within the computing services environment for each of these entities.

In some embodiments, a user may establish a local account without providing a personal identifier. For example, a local account may employ as an account identifier a professional email address associated with an entity acting as a client of the on-demand computing services environment. However, the user may provide personal information to supplement this professional identifier. For instance, a user may provide one or more names, personal email addresses, phone numbers, social media accounts, instant messaging accounts, or other such pieces of information. A user associated with multiple local accounts may then be tasked with providing and maintaining personal information across all of these accounts.

In some implementations, techniques and mechanisms described herein may provide for improved management of user accounts within a computing services environment. When a local user account is associated with verifiable information, the computing services environment may verify that information, for instance by transmitting a message to which the user responds. The verified information may then be used to check whether the user is associated with a global user account within the system. If the user is not associated with a global user account, then one may be created. If instead the user is associated with a global user account, then information may be propagated across the global user account and one or more local accounts.

For example, consider the situation of a user Alexandra. Alexandra is an independent contractor of Acme Corp., which manages its customers via customer relations management systems provided by an on-demand computing services environment managed by HighTech Corp. Because Alexandra must access HighTech's systems to interact with Acme's data, the user administrator at Acme created a user account for Alexandra that employs Alex's Acme email address as an identifier. When creating the account, Alexandra provided a personal email address as a backup in the event that she forgot a password and needed to perform a password reset operation. As an independent contractor, Alexandra also worked with many other clients of HighTech, such as Globex Corp., Initech Corp., and Cyberdyne Systems. Accordingly, Alexandra was associated with local accounts on HighTech's system for each of these clients.

Under conventional approaches, Alexandra would need to separately provide information and manage each of these client-specific accounts. A single sign-on system would be insufficient to address such a problem because each of Alexandra's accounts was separately created with client-specific access information. Furthermore, under a single sign-on approach, Alexandra's personal information provided under the context of one client-specific account would not be reconciled when creating a different client-specific account.

According to techniques and mechanisms described herein, in some embodiments Alexandra would need to provide and/or update certain types of information only once. For example, the system may verify Alexandra's personal email address by sending a verification message. After Alexandra's personal email address is verified, then personal information such as Alexandra's name, address, and phone number may be shared across the system, regardless of the local client-specific account in which that information was originally provided.

According to various embodiments, techniques and mechanisms described herein address a range of technical problems faced by providers of on-demand computing services environments. For example, on-demand computing services environments typically provide access to many different users associated with many different organizations. Such users typically establish different accounts with each organization within the computing services environment. Such accounts can share information in common and yet include context-specific information that should not be shared across the accounts. In some embodiments, techniques and mechanisms described herein facilitate information sharing and account linking in a manner that respects privacy permissions and reduces the need to collect duplicative information.

Conventional techniques for managing multiple accounts typically involve single sign-on (SSO) architectures. In an SSO system, a user establishes a single identity with an authenticating organization, such as Google or Facebook. The user then uses this single identity to authenticate at different independent organizations. For example, a website may allow a user to authenticate via an authentication API provided by Google. However, in such configurations, the different independent organizations are not under the control of the SSO service provider. Further, in such configurations, the user's local account information is not updated using local account information provided to a different organization. In addition, in such configurations, the user must make an explicit choice to log in via the SSO identifier. Thus, the SSO architecture does not address authentication and privacy concerns in a system where a user is associated with multiple local accounts in different contexts and with different permissions within a common computing services environment. Accordingly, conventional SSO techniques not suitable to a system in which a user is associated with multiple local accounts within a single overarching system.

FIG. 1 illustrates an example of an overview method 100 for cross-domain authentication, performed in accordance with one or more embodiments. According to various embodiments, the method 100 may be performed at one or more components of an on-demand computing services system, such as at the systems and components shown in FIG. 2, FIG. 4, FIG. 5A, and FIG. 5B.

At 102, a first user account is established in a first subdomain of a computing services environment. According to various embodiments, the first subdomain may correspond with a client of the computing services environment, a service provided by the computing services environment, or any other logical entity. The first user account may include information about an individual, such as the individual's name and contact data. The first user account may also include information about the individual's relationship with the logical entity, such as one or more permissions for interacting with data related to the entity within the computing services environment. Computing services environments, subdomains, and accounts are discussed in additional detail elsewhere herein, such as with respect to the computing services system 200 shown in FIG. 2.

In some embodiments, the first user account may be established at least in part based on an operation performed by an agent of the first subdomain. For example, an administrator of the first subdomain may initiate the creation of a new user account, for instance by adding a professional email address associated with the user and the first subdomain to the computing services system. Establishing the first user account may also involve operations performed by the user associated with the first user account. For instance, the user may provide personal information such as a personal email address, social media account identifier, or phone number.

At 104, a request to establish a second user account in a second subdomain of the computing services environment is received. In some implementations, the second user account may be established in a manner substantially similar to the first user account. However, the second user account may be established in a second subdomain. For example, the second subdomain may be a different service within the computing services environment. As another example, the second subdomain may be a different client of the computing services environment.

At 106, the first user account is reconciled with the second user account. Reconciling the first and second user accounts may involve any of a variety of operations for linking the two accounts. According to various embodiments, a global user account may be created. The global user account may include information that is specific to the user and is independent of the subdomains associated with the local user accounts.

In some implementations, personal information associated with the user may be verified. For example, a message may be sent to the user's personal email address, phone number, social networking account, instant messaging account, or other such contact point. The user may then respond to that message in some fashion in order to verify that the user is in control of that contact point.

In some embodiments, reconciling the user accounts may involve transferring information between local and/or global user accounts. For example, local account information such as a user's name or contact information may be transferred from an existing local account to a global user account. As another example, global user account information such as a user's name or contact information may be transferred to a newly created local account. Techniques for reconciling user accounts are discussed in additional detail elsewhere herein, such as with respect to the method 300 shown in FIG. 3.

Figure 2:
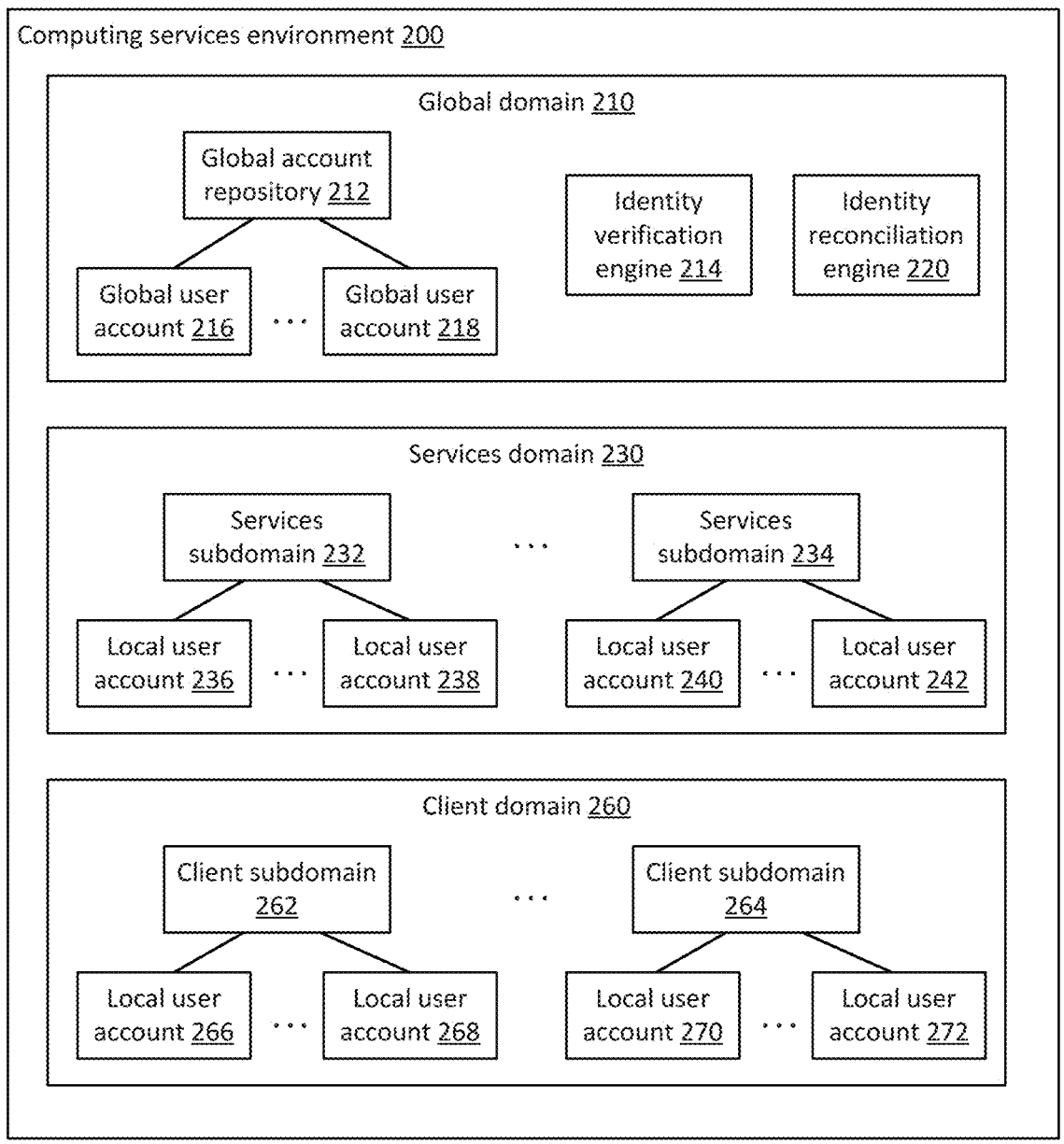
FIG. 2 illustrates an example of an arrangement of components in an on-demand computing services system, configured in accordance with one or more embodiments.

FIG. 2 illustrates an example of an arrangement of components in an on-demand computing services system 200, configured in accordance with one or more embodiments. According to various embodiments, the computing services environment 200 may be implemented in conjunction with one or more systems or components illustrated elsewhere herein, such as those shown in FIG. 4, FIG. 5A, and FIG. 5B. The computing services environment 200 may be configured to perform operations such as those discussed with respect to the method 100 shown in FIG. 1 and the method 300 shown in FIG. 3.

The computing services environment 200 includes a global domain 210, which includes a global user account repository 212, an identity verification engine 214, and an identity reconciliation engine 220. The global user account repository stores information about global user accounts, which include the global user accounts 216 through 218. The computing services environment 200 also includes a services domain 230, which includes the services subdomains 232 through 234. The services subdomains store information about local user accounts, which include the local user accounts 236 through 238 and 240 through 242. The computing services environment 200 also includes a client domain 260, which includes the client subdomains 266 through 264. The services subdomains store information about local user accounts, which include the local user accounts 266 through 268 and 270 through 272.

In some embodiments, each domain corresponds to a logical grouping of user accounts. A domain may include user accounts directly, or may include one or more subdomains. In the computing services system 200, the services domain 230 includes user accounts associated with specific services offered by the 200. For example, an end user may have an individual account that corresponds with a social networking subsystem offered by the 200, a customer relations management subsystem offered by the 200, or a web hosting subsystem offered by the 200. Each of these subsystems is represented in the services domain 230 by a different subdomain.

In the computing services system 200, the client domain 260 includes user accounts associated with clients of the computing services system 200. For example, the computing services system 200 may provide computing services to a variety of companies and organizations. Each of these companies and organizations may provide access to the computing services system 200 for potentially many different individuals who may conduct business related to the company or organization. Such individuals may be, for example, employees or independent contractors of the client. Each of these clients is represented in the client domain 260 by a different subdomain.

According to various embodiments, a computing services system may include any number of domains and subdomains. For example, the computing services system 200 includes a services domain 230 and a client domain 260. However, in some embodiments a computing services system may include, for instance, a domain corresponding to different corporate divisions of the service provider of the computing services system.

In some implementations, each local user account may include a variety of information related to a user. Such information may include, but is not limited to: a user identifier unique to the subdomain, a method of communicating with the user such as an email address or phone number, bibliographic information about the user, the user's role within the subdomain, and one or more permissions associated with the user's account.

In some embodiments, some information associated with a local user account may be specific to the subdomain. For example, in the case of a client subdomain representing a company purchasing computer services from the computing services system 200, the local user account information may identify the user's role within the company and the user's permissions vis-à-vis access to the company's data within the computing services system 200.

In some embodiments, some information associated with a local user account may be correspond with the user and be independent of the subdomain. For example, a local user account may be associated with a user's personal phone number or email address, which may facilitate communication and/or identity verification.

According to various embodiments, each user may be associated with one or more local user accounts. For example, a user may be an employee of different clients at different points in time. As another example, a user may simultaneously act as an independent contractor of different clients. As yet another example, a user may have local accounts associated with different services of the computing services system 200.

The global domain 210 corresponds with user account information that is shared across the system. For example, a user may provide verifiable information that is independent from a subdomain, such as a personal email address, social media account identifier, or phone number. That information may then be used to establish and/or update a global user account within the CSS 200. In turn, the global user account 200 may be linked with one or more local accounts. In this way, a user's information may be propagated across different local accounts. Techniques for performing such operations are discussed elsewhere herein, such as with respect to the method 300 shown in FIG. 3.

According to various embodiments, the identity verification engine 214 is configured to perform various operations related to verifying user identity information. For example, a user may specify a personal email address when creating or modifying a user account. The identity verification engine 214 may then transmit a message to the personal email address. When the user takes an action in response to receiving the message, the user's email address may be verified.

As another example, a user may specify a personal phone number when creating or modifying a user account. The identity verification engine 214 may then transmit an instruction to send a text message or voice call to the personal phone number. When the user takes an action in response to receiving the message or voice call, the user's personal phone number may be verified. Additional details regarding operations performed by the identity verification engine 214 are discussed throughout the application, such as with respect to the method 300 shown in FIG. 3.

In some embodiments, the identity reconciliation engine 220 is configured to perform operations related to linking global and/or local user accounts. For example, if a user creates a local account that shares verifiable information with a global user account, the identity reconciliation engine may take one or more steps to link the local and global user accounts. Such steps may include, but are not limited to: verifying the verifiable information via the identity verification engine 214, linking the global and local accounts in the database system, and/or transferring information between the global and local accounts. Additional details regarding operations performed by the identity reconciliation engine 220 are discussed throughout the application, such as with respect to the method 300 shown in FIG. 3.

Figure 3:
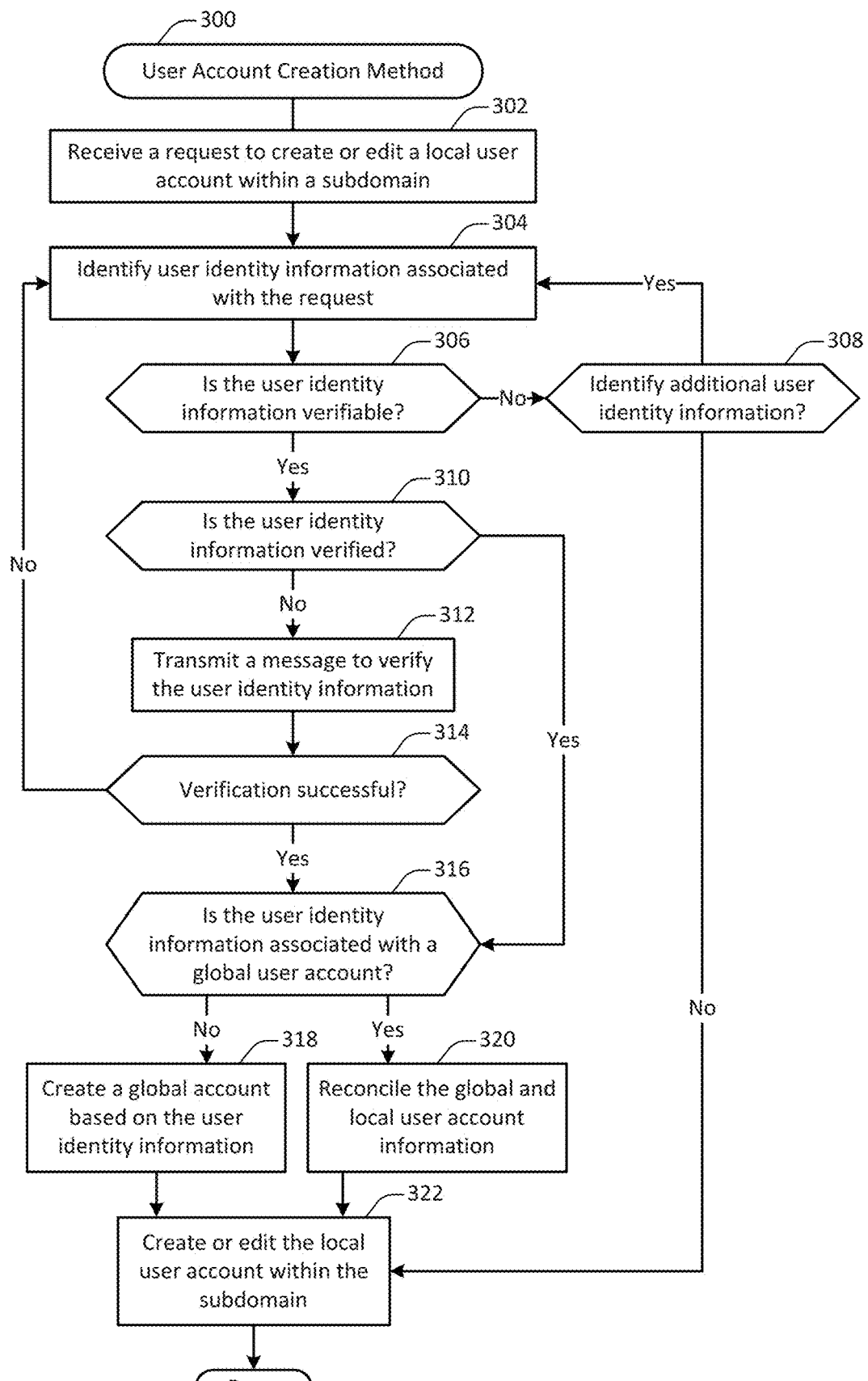
FIG. 3 illustrates an example of a method for creating a user account, performed in accordance with one or more embodiments.

FIG. 3 illustrates an example of a method 300 for creating or editing a user account, performed in accordance with one or more embodiments. According to various embodiments, the method 300 may be performed at one or more components of a computing services environment. For example, the method 300 may be performed at an application server in conjunction with an identity verification engine 214, an identity reconciliation engine 220, and a global user account repository 212.

A request to create or edit a local user account within a subdomain at 302. According to various embodiments, the request may be received from a client machine in communication with the on-demand computing services environment. For example, the request may be received from a client machine associated with a user accessing the computing services environment to create or edit an account.

In some implementations, the request may be associated with the creation of an account. For example, a user new to the subdomain may request to create a new account. Such a request may be generated when an administrator requests to add a new user to the subdomain. Alternately, a user may request to create an account of their own accord.

In some embodiments, the request may be associated with an existing account. For example, a user may request to add information to an existing account. As another example, a user may request to modify existing information associated with an existing account.

User identity information associated with the request is identified at 304. In some embodiments, the user identity information may include one or more items of information specific to the user associated with the request. Such information may include, but is not limited to: a name, a title, a personal email address, a professional email address, a telephone number, a social media account identifier, an instant messaging account identifier, and a mailing address.

In some implementations, the user identity information may be included with the request itself. For example, the user may request to create a local user account for a user having a designated name and email address. As another example, the user may request to update an existing local user account to include a designated telephone number or social media account identifier.

According to various embodiments, the user identity information may be retrieved from the computing services environment. For example, the request may identify a local user account for modification, and the system may retrieve the identity information from data stored in association with that account.

A determination is made at 306 as to whether the user identity information is verifiable. In some implementations, the determination may be made on the type of information. For example, information such as an email address, phone number, social media account identifier, or instant messaging account identifier may be deemed verifiable because a message having confirmation instructions may be sent to the user via that information. As another example, information such as a user's name or job title may be deemed not verifiable because such information does not uniquely identify the user even it the information were confirmed.

If the user identity information is not verifiable, then a determination is made at 308 as to whether to identify additional user identity information. According to various embodiments, the determination may be made at least in part based on user input. For example, the user may be presented with a user interface prompt asking whether to identify additional user identity information.

In some implementations, the determination made at 308 may be made at least in part automatically. For instance, if the user is not associated with any other verifiable information, then a determination may be automatically made to identify additional user identity information.

In particular embodiments, the determination made at operation 308 may be optional. For example, the system may require the account to be associated with at least some piece of verifiable user identity information. In such a configuration, if the user identity information identified at operation 304 is not verified and/or cannot be verified, then additional user identity information may be requested automatically.

If the user identity information is verifiable, then a determination is made at 310 as to whether to the user identity information is already verified. For example, if the identity information is associated with an existing account, then the identity information may have been verified in the past. The verification status of the information may be stored in the database, for instance as a Boolean value.

In particular embodiments, user identity information may be periodically re-verified. For example, when a user is making a significant change to an account, a follow-up verification email may be sent.

If the user identity information is not verified, then a message to verify the user identity information is transmitted at 312. According to various embodiments, the type of message that is transmitted may depend on one or more characteristics of the user identity information. For example, if the user identity information includes an email address, then an email message that includes a verification request link for verifying the email address may be sent. As another example, if the user identity information includes a telephone number, then either a text message or a voice call may be sent with instructions for confirming the phone number as being associated with the user. As another example, if the user identity information includes a social media account identifier or an instant messaging account identifier, then a suitable message may be sent that includes a verification request link or other instructions for confirming the identifier as being associated with the request.

A determination is made at 314 as to whether the user identity information verification is successful. In some implementations, the determination may be based on the receipt of a response to the message sent at operation 312. For instance, a determination may be made as to whether the system detected a suitable response to a voice call, an HTTP request that would indicate a click or a verification request link, or a text message transmitted as a confirmation. If the user identity is not verified, then the verification process may be attempted again, or alternate user identity information may be identified at operation 304.

A determination is made at 316 as to whether the user identity information is associated with a global user account. According to various embodiments, the determination may be made by using the user identity information to query the global user account repository 212. For example, if the user identity information includes an email address, then a determination may be made as to whether the email address is associated with a global user account stored in the global user account repository.

In particular embodiments, verification may be performed at least in part by a third-party service. For example, a partner may verify user identity information and then indicate to the service provider that the information was verified successfully.

If the user identity information is not associated with a global user account, then a global user account is created at 318 is created based on the user identity information. According to various embodiments, creating the global user account may involve any of a variety of operations related to account creation. For example, a new entry may be added to the global user account repository 212 shown in FIG. 2. As another example, the global user account may be linked with the local user account created at 322.

If instead the user identity information is associated with a global user account, then the global and local user account information is reconciled at 320. In some implementations, reconciling the global and local user account information may involve resolving contradictory information. For example, if a global and local user account are associated with inconsistent identification information, then a message may be sent asking a user to select the identification to use.

In some embodiments, reconciling the global and local user account information may involve linking the two accounts. For example, the global account repository 212 may include a correspondence table linking each global account with a local account. A single global account may include potentially many such entries, depending on the number of local accounts with which the global account is associated. Accordingly, reconciling the global and local user account information may involve creating an entry in such a database table.

In some embodiments, reconciling the global and local user account information may involve transferring information from the local user account to the global user account. For example, user information such as a user's name, title, job description, and preferences may be copied from a database entry associated with the local user account to a database entry associated with the global user account.

In some embodiments, reconciling the global and local user account information may involve transferring information from the global user account to the local user account. For example, user information such as a user's name, title, job description, and preferences may be copied from a database entry associated with the global user account to a database entry associated with the local user account.

In particular embodiments, reconciling the global and local user account information may involve merging two accounts. For example, a first local account and a second local account may be merged if they are associated with shared, verified user identity information.

In particular embodiments, reconciling the global and local user account information may involve adding a new login method to an existing account. For example, an account may be associated with a username and password. When a new identifier is added to the account, such as a personal email address associated with a single-signon system, then that personal email address may be linked with the account as a new login credential.

In some implementations, reconciling account information may involve resolving inconsistent information. For instance, one account may be associated with a first home address, while another account may be associated with a second home address. In such situations, the system may employ one or more rules for information resolution. For example, the system may select the most recent piece of inconsistent information to use with the account. As another example, the system may present the inconsistent information to the user and ask the user to select between the inconsistent fields. As yet another example, the system may associated both pieces of information with the account. For instance, an account may be associated with multiple personal email addresses.

The local user account is created or edited within the subdomain at 322. According to various embodiments, creating the local user account may involve any of a variety of operations related to account creation. For example, a new entry may be added to a client subdomain account repository such as the client subdomain 262 shown in FIG. 2. As another example, the user account may be associated with one or more permissions that specify how the user account is allowed to interact with data and services within the on-demand computing services environment.

In some embodiments, editing the local user account may involve updating one or more database entries. For example, a database entry associated with the local user account may be updated to include newly added and/or newly verified information provided as part of the method 300.

Figure 4:
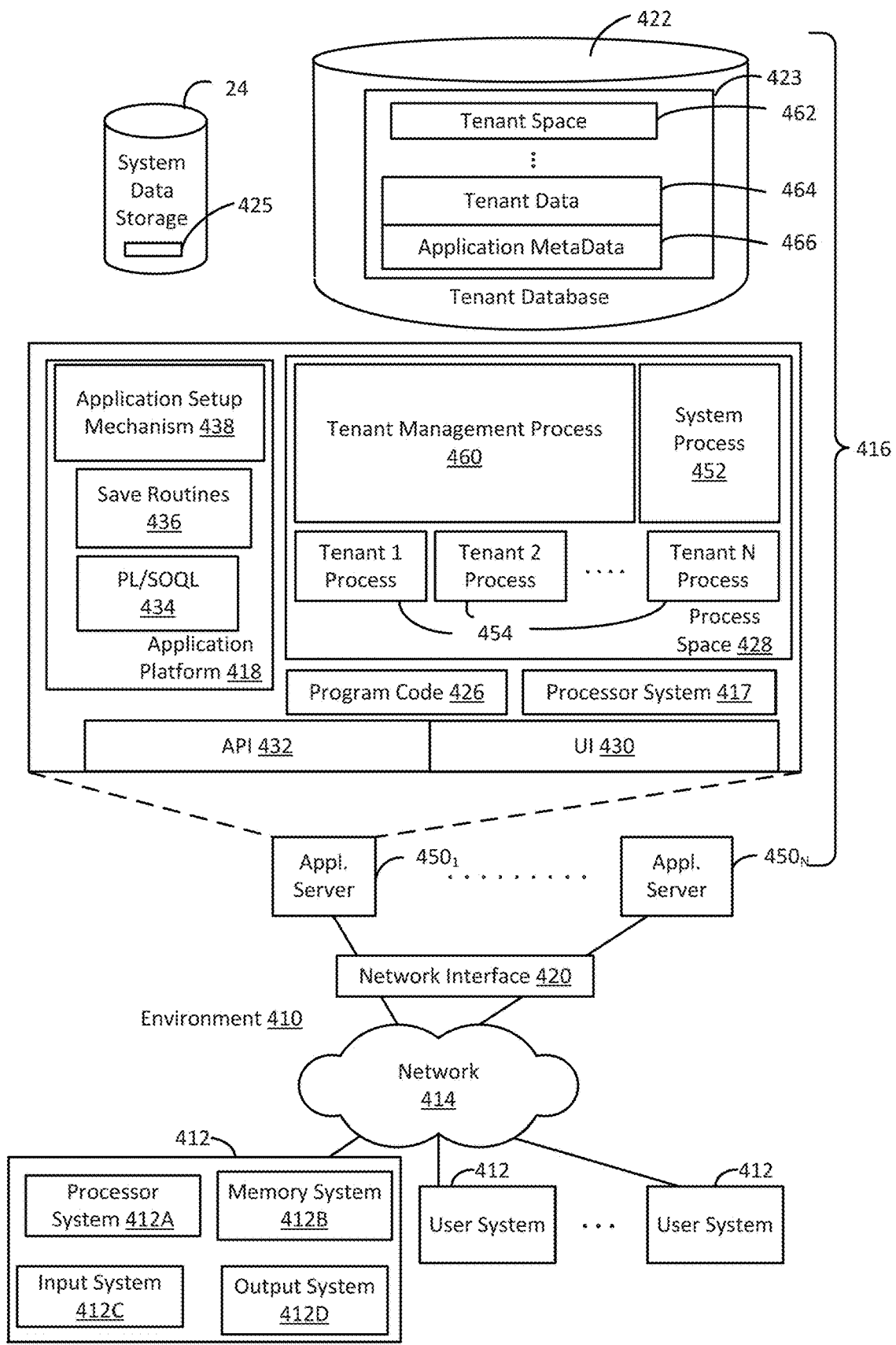
FIG. 4 shows a block diagram of an example of an environment that includes an on-demand database service configured in accordance with some implementations.

FIG. 4 shows a block diagram of an example of an environment 410 that includes an on-demand database service configured in accordance with some implementations. Environment 410 may include user systems 412, network 414, database system 416, processor system 417, application platform 418, network interface 420, tenant data storage 422, tenant data 423, system data storage 424, system data 425, program code 426, process space 428, User Interface (UI) 430, Application Program Interface (API) 432, PL/SOQL 434, save routines 436, application setup mechanism 438, application servers 450-1 through 450-N, system process space 452, tenant process spaces 454, tenant management process space 460, tenant storage space 462, user storage 464, and application metadata 466. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 416, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 18 may be a framework that allows the creation, management, and execution of applications in system 416. Such applications may be developed by the database service provider or by users or third-party application developers accessing the service. Application platform 418 includes an application setup mechanism 438 that supports application developers' creation and management of applications, which may be saved as metadata into tenant data storage 422 by save routines 436 for execution by subscribers as one or more tenant process spaces 454 managed by tenant management process 460 for example. Invocations to such applications may be coded using PL/SOQL 434 that provides a programming language style interface extension to API 432. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 466 for a subscriber making such an invocation. Such system processes may also manage execution of application metadata 466 as an application in a virtual machine.

In some implementations, each application server 450 may handle requests for any user associated with any organization. A load balancing function (e.g., an F5 Big-IP load balancer) may distribute requests to the application servers 450 based on an algorithm such as least-connections, round robin, observed response time, etc. Each application server 450 may be configured to communicate with tenant data storage 422 and the tenant data 423 therein, and system data storage 424 and the system data 425 therein to serve requests of user systems 412. The tenant data 423 may be divided into individual tenant storage spaces 462, which can be either a physical arrangement and/or a logical arrangement of data. Within each tenant storage space 462, user storage 464 and application metadata 466 may be similarly allocated for each user. For example, a copy of a user's most recently used (MRU) items might be stored to user storage 464. Similarly, a copy of MRU items for an entire tenant organization may be stored to tenant storage space 462. A UI 430 provides a user interface and an API 432 provides an application programming interface to system 416 resident processes to users and/or developers at user systems 412.

System 416 may implement a web-based authentication system. For example, in some implementations, system 416 may include application servers configured to implement and execute identity verification software applications. The application servers may be configured to provide related data, code, forms, web pages and other information to and from user systems 412. Additionally, the application servers may be configured to store information to, and retrieve information from a database system. Such information may include related data, objects, and/or Webpage content. With a multi-tenant system, data for multiple tenants may be stored in the same physical database object in tenant data storage 422, however, tenant data may be arranged in the storage medium(s) of tenant data storage 422 so that data of one tenant is kept logically separate from that of other tenants. In such a scheme, one tenant may not access another tenant's data, unless such data is expressly shared.

Several elements in the system shown in FIG. 4 include conventional, well-known elements that are explained only briefly here. For example, user system 412 may include processor system 412A, memory system 412B, input system 412C, and output system 412D. A user system 412 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 412 to access, process and view information, pages and applications available from system 416 over network 414. Network 414 may be any network or combination of networks of devices that communicate with one another, such as any one or any combination of a LAN (local area network), WAN (wide area network), wireless network, or other appropriate configuration.

The users of user systems 412 may differ in their respective capacities, and the capacity of a particular user system 412 to access information may be determined at least in part by "permissions" of the particular user system 412. As discussed herein, permissions generally govern access to computing resources such as data objects, components, and other entities of a computing system, such as a global and/or local user accounts, a social networking system, and/or a CRM database system. "Permission sets" generally refer to groups of permissions that may be assigned to users of such a computing environment. For instance, the assignments of users and permission sets may be stored in one or more databases of System 416. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 416 may provide on-demand database service to user systems 412 using an MTS arrangement. By way of example, one tenant organization may be a company that employs a sales force where each salesperson uses system 416 to manage their sales process. Thus, a user in such an organization may maintain contact data, leads data, customer follow-up data, performance data, goals and progress data, etc., all applicable to that user's personal sales process (e.g., in tenant data storage 422). In this arrangement, a user may manage his or her sales efforts and cycles from a variety of devices, since relevant data and applications to interact with (e.g., access, view, modify, report, transmit, calculate, etc.) such data may be maintained and accessed by any user system 412 having network access.

When implemented in an MTS arrangement, system 416 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 416 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 416 may also maintain system-level data usable by multiple tenants or other data. Such system-level data may include industry reports, news, postings, and the like that are sharable between tenant organizations.

In some implementations, user systems 412 may be client systems communicating with application servers 450 to request and update system-level and tenant-level data from system 416. By way of example, user systems 412 may send one or more queries requesting data of a database maintained in tenant data storage 422 and/or system data storage 424. An application server 450 of system 416 may automatically generate one or more SQL statements (e.g., one or more SQL queries) that are designed to access the requested data. System data storage 424 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For example, all tenants may have access to standard tables in which global and/or local user account information is stored. For CRM database applications, such standard entities might include tables for case, account, contact, lead, and opportunity data objects, each containing predefined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 5A:
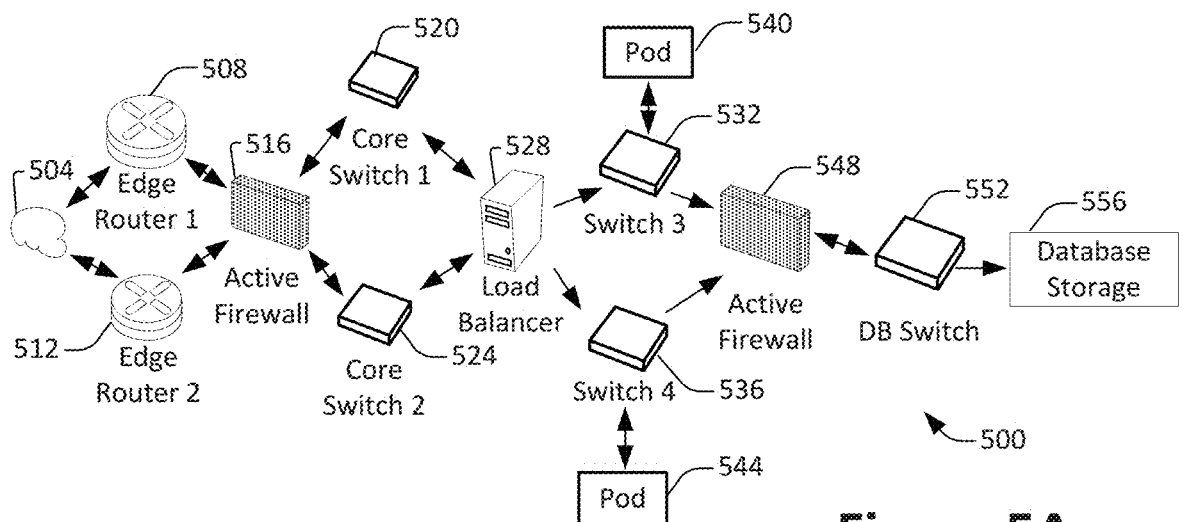
FIG. 5A shows a system diagram of an example of architectural components of an on-demand database service environment, configured in accordance with some implementations.

FIG. 5A shows a system diagram of an example of architectural components of an on-demand database service environment 500, configured in accordance with some implementations. A client machine located in the cloud 504 may communicate with the on-demand database service environment via one or more edge routers 508 and 512. A client machine may include any of the examples of user systems 412 described above. The edge routers 508 and 512 may communicate with one or more core switches 520 and 524 via firewall 516. The core switches may communicate with a load balancer 528, which may distribute server load over different pods, such as the pods 540 and 544 by communication via pod switches 532 and 536. The pods 540 and 544, which may each include one or more servers and/or other computing resources, may perform data processing and other operations used to provide on-demand services. Components of the environment may communicate with a database storage 556 via a database firewall 548 and a database switch 552.

Accessing an on-demand database service environment may involve communications transmitted among a variety of different components. The environment 500 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 5A and 5B.

The cloud 504 refers to any suitable data network or combination of data networks, which may include the Internet. Client machines located in the cloud 504 may communicate with the on-demand database service environment 500 to access services provided by the on-demand database service environment 500. By way of example, client machines may access the on-demand database service environment 500 to retrieve, store, edit, and/or process user account, user identity, and/or user authentication information.

In some implementations, the edge routers 508 and 512 route packets between the cloud 504 and other components of the on-demand database service environment 500. The edge routers 508 and 512 may employ the Border Gateway Protocol (BGP). The edge routers 508 and 512 may maintain a table of IP networks or 'prefixes', which designate network reachability among autonomous systems on the internet.

In one or more implementations, the firewall 516 may protect the inner components of the environment 500 from internet traffic. The firewall 516 may block, permit, or deny access to the inner components of the on-demand database service environment 500 based upon a set of rules and/or other criteria. The firewall 516 may act as one or more of a packet filter, an application gateway, a stateful filter, a proxy server, or any other type of firewall.

In some implementations, the core switches 520 and 524 may be high-capacity switches that transfer packets within the environment 500. The core switches 520 and 524 may be configured as network bridges that quickly route data between different components within the on-demand database service environment. The use of two or more core switches 520 and 524 may provide redundancy and/or reduced latency.

In some implementations, communication between the pods 540 and 544 may be conducted via the pod switches 532 and 536. The pod switches 532 and 536 may facilitate communication between the pods 540 and 544 and client machines, for example via core switches 520 and 524. Also or alternatively, the pod switches 532 and 536 may facilitate communication between the pods 540 and 544 and the database storage 556. The load balancer 528 may distribute workload between the pods, which may assist in improving the use of resources, increasing throughput, reducing response times, and/or reducing overhead. The load balancer 528 may include multilayer switches to analyze and forward traffic.

In some implementations, access to the database storage 556 may be guarded by a database firewall 548, which may act as a computer application firewall operating at the database application layer of a protocol stack. The database firewall 548 may protect the database storage 556 from application attacks such as structure query language (SQL) injection, database rootkits, and unauthorized information disclosure. The database firewall 548 may include a host using one or more forms of reverse proxy services to proxy traffic before passing it to a gateway router and/or may inspect the contents of database traffic and block certain content or database requests. The database firewall 548 may work on the SQL application level atop the TCP/IP stack, managing applications' connection to the database or SQL management interfaces as well as intercepting and enforcing packets traveling to or from a database network or application interface.

In some implementations, the database storage 556 may be an on-demand database system shared by many different organizations. The on-demand database service may employ a single-tenant approach, a multi-tenant approach, a virtualized approach, or any other type of database approach. Communication with the database storage 556 may be conducted via the database switch 552. The database storage 556 may include various software components for handling database queries. Accordingly, the database switch 552 may direct database queries transmitted by other components of the environment (e.g., the pods 540 and 544) to the correct components within the database storage 556.

Figure 5B:
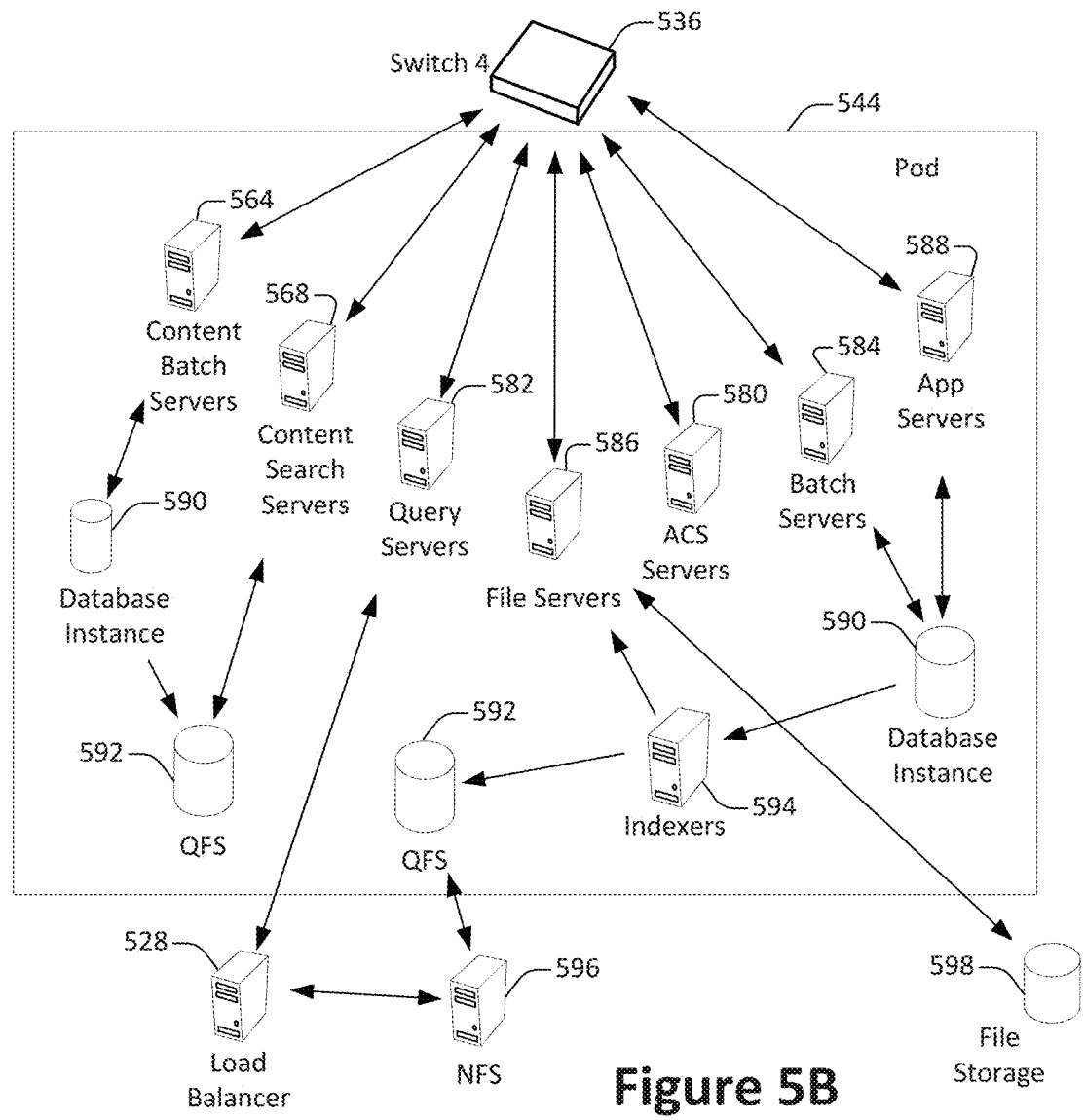
FIG. 5B shows a system diagram further illustrating an example of architectural components of an on-demand database service environment, in accordance with some implementations.

FIG. 5B shows a system diagram further illustrating an example of architectural components of an on-demand database service environment, in accordance with some implementations. The pod 544 may be used to render services to user(s) of the on-demand database service environment 500. The pod 544 may include one or more content batch servers 564, content search servers 568, query servers 582, file servers 586, access control system (ACS) servers 580, batch servers 584, and app servers 588. Also, the pod 544 may include database instances 590, quick file systems (QFS) 592, and indexers 594. Some or all communication between the servers in the pod 544 may be transmitted via the switch 536.

In some implementations, the app servers 588 may include a framework dedicated to the execution of procedures (e.g., programs, routines, scripts) for supporting the construction of applications provided by the on-demand database service environment 500 via the pod 544. One or more instances of the app server 588 may be configured to execute all or a portion of the operations of the services described herein.

In some implementations, as discussed above, the pod 544 may include one or more database instances 590. A database instance 590 may be configured as an MTS in which different organizations share access to the same database, using the techniques described above. Database information may be transmitted to the indexer 594, which may provide an index of information available in the database 590 to file servers 586. The QFS 592 or other suitable filesystem may serve as a rapid-access file system for storing and accessing information available within the pod 544. The QFS 592 may support volume management capabilities, allowing many disks to be grouped together into a file system. The QFS 592 may communicate with the database instances 590, content search servers 568 and/or indexers 594 to identify, retrieve, move, and/or update data stored in the network file systems (NFS) 596 and/or other storage systems.

In some implementations, one or more query servers 582 may communicate with the NFS 596 to retrieve and/or update information stored outside of the pod 544. The NFS 596 may allow servers located in the pod 544 to access information over a network in a manner similar to how local storage is accessed. Queries from the query servers 522 may be transmitted to the NFS 596 via the load balancer 528, which may distribute resource requests over various resources available in the on-demand database service environment 500. The NFS 596 may also communicate with the QFS 592 to update the information stored on the NFS 596 and/or to provide information to the QFS 592 for use by servers located within the pod 544.

In some implementations, the content batch servers 564 may handle requests internal to the pod 544. These requests may be long-running and/or not tied to a particular customer, such as requests related to log mining, cleanup work, and maintenance tasks. The content search servers 568 may provide query and indexer functions such as functions allowing users to search through content stored in the on-demand database service environment 500. The file servers 586 may manage requests for information stored in the file storage 598, which may store information such as documents, images, basic large objects (BLOBs), etc. The query servers 582 may be used to retrieve information from one or more file systems. For example, the query system 582 may receive requests for information from the app servers 588 and then transmit information queries to the NFS 596 located outside the pod 544. The ACS servers 580 may control access to data, hardware resources, or software resources called upon to render services provided by the pod 544. The batch servers 584 may process batch jobs, which are used to run tasks at specified times. Thus, the batch servers 584 may transmit instructions to other servers, such as the app servers 588, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 6:
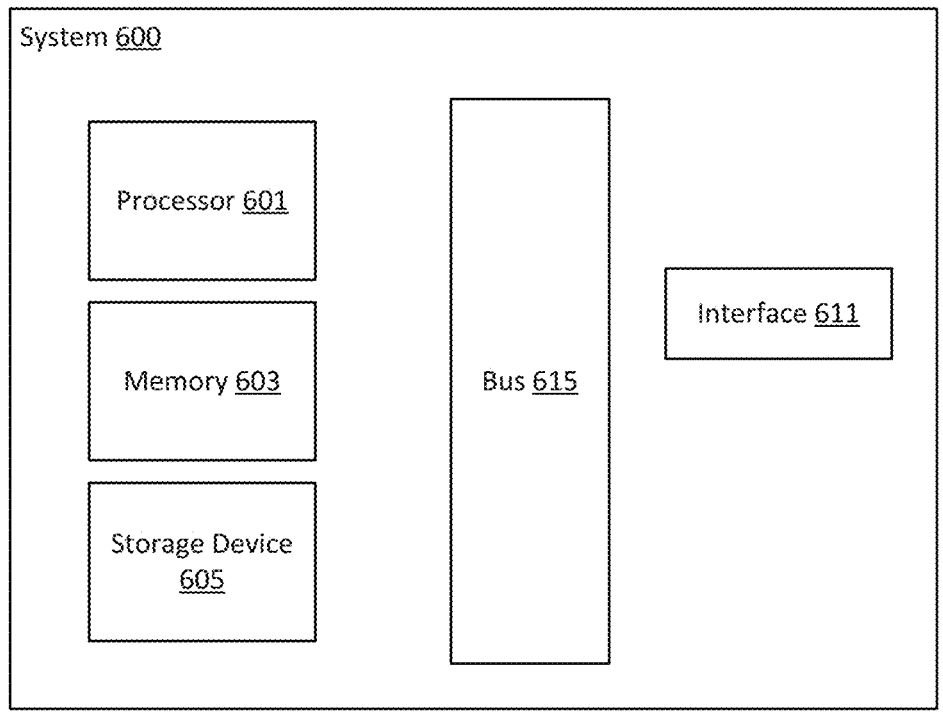
FIG. 6 illustrates one example of a computing device, configured in accordance with one or more embodiments.

FIG. 6 illustrates one example of a computing device. According to various embodiments, a system 600 suitable for implementing embodiments described herein includes a processor 601, a memory module 603, a storage device 605, an interface 611, and a bus 615 (e.g., a PCI bus or other interconnection fabric.) System 600 may operate as variety of devices such as an application server, a database server, or any other device or service described herein. Although a particular configuration is described, a variety of alternative configurations are possible. The processor 601 may perform operations such as those described herein. Instructions for performing such operations may be embodied in the memory 603, on one or more non-transitory computer readable media, or on some other storage device. Various specially configured devices can also be used in place of or in addition to the processor 601. The interface 611 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of the present invention apply to a wide variety of computing environments. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

The invention claimed is:

1. A method comprising:
  receiving a request to create a first user account associated with a first subdomain of an on-demand database system, the first user account including a first user identifier unique to the first subdomain, the request identifying a designated personal communications address associated with a third-party account provided by a third-party service provider that is external to the on-demand database system;
  identifying via a processor a second user account associated with a second subdomain of the on-demand database system, the second user account including a second user identifier unique to the second subdomain, the second user account being associated with the designated personal communications address; and
  creating the first user account using personal information retrieved from the second user account, the first user account being linked to the second user account via a global account within the on-demand database system.

2. The method recited in claim 1, wherein the first subdomain corresponds with a first client of the on-demand database system, and wherein the second subdomain corresponds with a second client of the on-demand database system, and wherein the first and second user accounts are associated with an employee of the first and second clients.

3. The method recited in claim 1, wherein the first subdomain corresponds with a first service provided via the on-demand database system, and wherein the second subdomain corresponds with a second service provided via the on-demand database system, and wherein the first and second user accounts are associated with an end user of the first and second services.

4. The method recited in claim 1, wherein the on-demand database system includes a multi-tenant database system.

5. The method recited in claim 4, wherein the first and second subdomains correspond to first and second tenants within the multi-tenant database system.

6. The method recited in claim 1, wherein the method further comprises:
  transmitting a verification request message to the designated personal communications address via a communications interface.

7. The method recited in claim 6, wherein the method further comprises:
  receiving a verification response message from the designated personal communications address via the communications interface.

8. The method recited in claim 6, wherein the designated personal communications address includes an address selected from the group consisting of: a telephone number, an email address, a social media account identifier, and an instant messaging account identifier.

9. The method recited in claim 1, wherein the personal information includes configuration information designating a configuration of the on-demand database system for use by a user associated with the second user account.

10. The method recited in claim 1, wherein the personal information includes bibliographic information describing a user associated with the second user account.

11. The method recited in claim 1, wherein the on-demand database system is configured to provide customer relations management services to a plurality of clients.

12. A computing system comprising:
  a communication interface receiving a request to create a first user account associated with a first subdomain of an on-demand database system, the first user account including a first user identifier unique to the first subdomain, the request identifying a designated personal communications address associated with a third-party account provided by a third-party service provider that is external to the on-demand database system;

a processor identifying a second user account associated with a second subdomain of the on-demand database system, the second user account including a second user identifier unique to the second subdomain, the second user account being associated with the designated personal communications address; and a database system storing information for the first user account, the first user account created using personal information retrieved from the second user account, the first user account being linked to the second user account via a global account within the on-demand database system.

13. The computing system recited in claim 12, wherein the first subdomain corresponds with a first client of the on-demand database system, and wherein the second subdomain corresponds with a second client of the on-demand database system, and wherein the first and second user accounts are associated with an employee of the first and second clients.

14. The computing system recited in claim 12, wherein the first subdomain corresponds with a first service provided via the on-demand database system, and wherein the second subdomain corresponds with a second service provided via the on-demand database system, and wherein the first and second user accounts are associated with an end user of the first and second services.

15. The computing system recited in claim 12, wherein the on-demand database system includes a multi-tenant database system, and wherein the first and second subdomains correspond to first and second tenants within the multi-tenant database system.

16. The computing system recited in claim 12, wherein the computing system is further configurable to:

transmit a verification request message to the designated personal communications address via a communications interface, wherein the designated personal communications address includes an address selected from the group consisting of: a telephone number, an email address, a social media account identifier, and an instant messaging account identifier; and receive a verification response message from the designated personal communications address via the communications interface.

17. A computer program product comprising computer-readable program code capable of being executed by one or more processors when retrieved from a non-transitory computer-readable medium, the program code comprising instructions configurable to cause the one or more processors to perform a method comprising:

receiving a request to create a first user account associated with a first subdomain of an on-demand database system, the first user account including a first user identifier unique to the first subdomain, the request identifying a designated personal communications address associated with a third-party account provided by a third-party service provider that is external to the on-demand database system;

identifying via a processor a second user account associated with a second subdomain of the on-demand database system, the second user account including a second user identifier unique to the second subdomain, the second user account being associated with the designated personal communications address; and creating the first user account using personal information retrieved from the second user account, the first user account being linked to the second user account via a global account within the on-demand database system.

18. The computer program product recited in claim 17, wherein the method further comprises:

transmitting a verification request message to the designated personal communications address via a communications interface, wherein the designated personal communications address includes an address selected from the group consisting of: a telephone number, an email address, a social media account identifier, and an instant messaging account identifier; and receiving a verification response message from the designated personal communications address via the communications interface.

19. The computer program product recited in claim 17, wherein the on-demand database system includes a multi-tenant database system, wherein the first and second subdomains correspond to first and second tenants within the multi-tenant database system, and wherein the on-demand database system is configured to provide customer relations management services to a plurality of clients.

* * * * *